(12) United States Patent
Kim et al.

(10) Patent No.: US 7,625,669 B2
(45) Date of Patent: Dec. 1, 2009

(54) LITHIUM SECONDARY BATTERY HAVING IMPROVED STABILITY TO OVERCHARGE

(75) Inventors: Bo Hyun Kim, Seoul (KR); Kwangho Yoo, Daejeon (KR); Hyunwoo Park, Daejeon (KR); Hey Woong Park, Daejeon (KR); Jisang Yu, Daejeon (KR)

(73) Assignee: LG Chem, Ltd. (KR)

( * ) Notice: Subject to any disclaimer, the term of this patent is extended or adjusted under 35 U.S.C. 154(b) by 162 days.

(21) Appl. No.: 11/406,656

(22) Filed: Apr. 19, 2006

(65) Prior Publication Data

US 2006/0251956 A1 Nov. 9, 2006

(30) Foreign Application Priority Data

Apr. 20, 2005 (KR) ...................... 10-2005-0032927

(51) Int. Cl.
*H01M 4/60* (2006.01)
*H01M 10/50* (2006.01)

(52) U.S. Cl. .......................... 429/212; 429/62; 429/215

(58) Field of Classification Search ................. 429/215, 429/217, 218.1, 232, 62, 212; 442/59, 64, 442/71; 428/315.9
See application file for complete search history.

(56) References Cited

U.S. PATENT DOCUMENTS

| | | | | |
|---|---|---|---|---|
| 3,501,326 A | * | 3/1970 | Hochberg et. al. ............ 442/71 |
| 4,985,036 A | * | 1/1991 | Lommen et al. .......... 623/15.12 |
| 5,534,365 A | * | 7/1996 | Gee et al. ...................... 429/62 |
| 5,759,714 A | * | 6/1998 | Matsufuji et al. ............ 429/336 |
| 2004/0234865 A1 | * | 11/2004 | Sato et al. .................... 429/322 |

* cited by examiner

*Primary Examiner*—Jennifer K Michener
*Assistant Examiner*—Claire L Rademaker
(74) *Attorney, Agent, or Firm*—Cantor Colburn LLP

(57) ABSTRACT

Disclosed is a lithium secondary battery comprising an electrode assembly composed of a cathode, an anode and a separator, and a lithium electrolyte, wherein the electrodes and/or electrolyte include a compound ("urethane compound") and/or polymer ("poly urethane") which are decomposed upon overcharge of the battery and contain a urethane group in a molecular structure thereof.

The lithium secondary battery of the present invention is characterized by addition of a compound or polymer having a urethane group to electrodes and/or electrolyte, wherein the thus-added compound and/or polymer have substantially no adverse effects on general performance of the battery under normal operating conditions and are decomposed with high reliability upon overcharge of the battery, thereby offering time delay effects for securing battery safety, and the decomposition products thereof result in sharply increased internal resistance of the battery, thereby increasing battery safety.

5 Claims, 1 Drawing Sheet

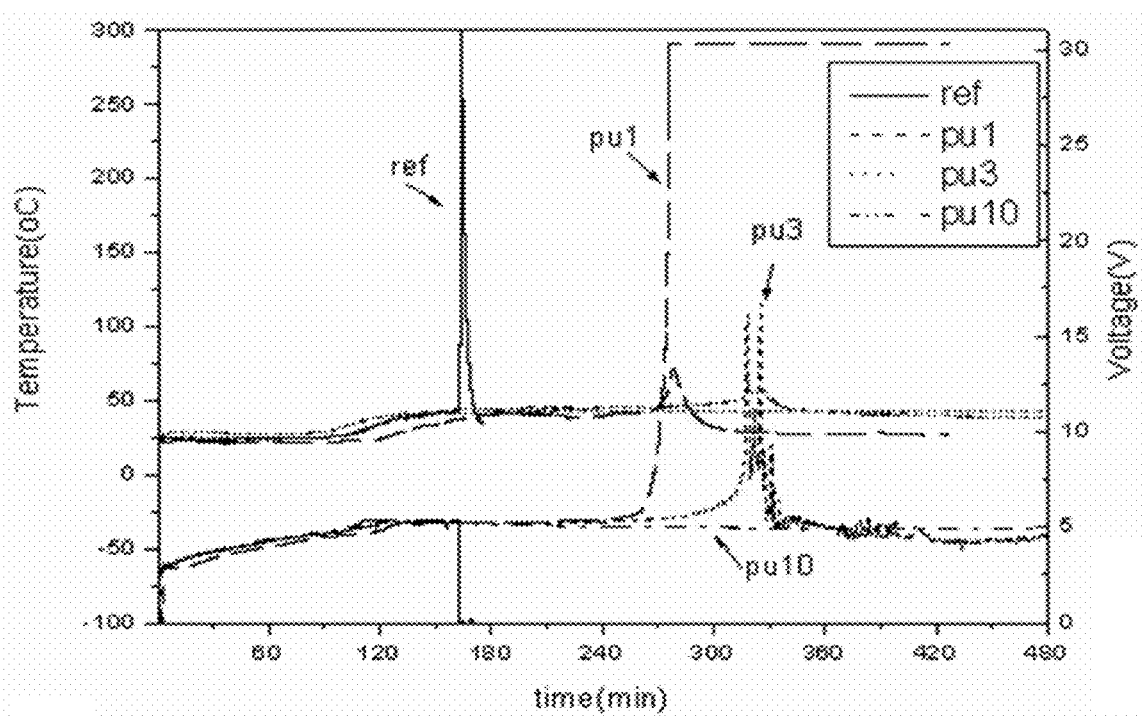

LITHIUM SECONDARY BATTERY HAVING IMPROVED STABILITY TO OVERCHARGE

FIELD OF THE INVENTION

The present invention relates to a lithium secondary battery having improved overcharge safety. More specifically, the present invention relates to a lithium secondary battery having significantly improved overcharge safety with minimal adverse effects on general performance thereof under normal operation conditions, via addition of a compound or polymer having a urethane group to electrodes and/or electrolyte.

BACKGROUND OF THE INVENTION

Technological development and increased demand for mobile equipment have led to a rapid increase in the demand for secondary batteries as an energy source. Among these secondary batteries, a great deal of research and study has been focused on a lithium secondary battery having high-energy density and high-discharge voltage and thus some of such lithium secondary batteries are commercially available and widely used.

However, conventional lithium secondary batteries are susceptible to the high-risk of ignition/explosion arising from heating of batteries by IR-induced heat generation when large amounts of electrical current flow within a short period of time due to various factors such as exposure to high temperatures, overcharge, external short-circuiting, nail penetration, localized crushing and the like. Elevation of the battery temperature results in facilitation of reaction between the electrolyte and electrodes. As a consequence, occurrence of reaction heat is additionally accompanied by elevation of the battery temperature which in turn further accelerates the reaction between the electrolyte and electrodes. Therefore, the temperature of the battery rises sharply, thereby further accelerating the reaction between the electrolyte and electrodes. Due to being caught in such self perpetuating cycle, thermal runaway, which causes sharp elevation in the battery temperature, occurs, and ignition of the battery may take place if the battery temperature rises over a specified range. In addition, the reaction between the electrolyte and electrodes leads to generation of gases which in turn results in increased internal pressure of the battery and consequently the battery undergoes explosion at pressure exceeding a predetermined range. As such, it can be said that the risk of ignition/explosion is the most fatal disadvantage of lithium secondary batteries.

Therefore, an essential requirement, which should be considered for the development of lithium secondary batteries, is to secure the battery safety. As attempts to secure the battery safety, there may be mentioned a method of disposing some elements externally of the cell and a method of using materials inside the cell. The former method involves elements such as a Positive Temperature Coefficient (PTC) device using temperature changes, a Circuit Interrupt Device (CID), a protection circuit for controlling voltage and current, and Safety Vent using changes in internal pressure of the battery, whereas the latter method involves addition of materials which can undergo physical, chemical or electrochemical changes in response to changes of internal temperature, voltage or current of the battery.

Devices disposed externally of the cell exert their functions by using changes of temperature, voltage, current and internal pressure of the battery and therefore offer accurate shutdown, but suffer from disadvantages such as a need for additional installation processes and space and limited application of CID devices to cylindrical batteries only. Further, it is also known that such external devices do not sufficiently exert their protection function when a rapid response time is required as in external short-circuiting, nail penetration, localized crushing and the like.

Meanwhile, one of the methods of using material incorporated internally of the cell is to add additives capable of improving safety to electrolytes or electrodes. For example, there are known various methods as follows: for example, a method of adding materials, which undergo electrochemical polymerization under overcharge conditions or the like, to electrolytes, whereby, upon overcharge, the resulting polymerization products form an immobilized film on the electrodes or the electrolytes are solidified, thereby inhibiting abnormal operation of the battery, and a method of inhibiting abnormal operation of the battery by increasing resistance of the electrode via swelling of an additive volume upon exposure to high temperatures or overcharge. Such chemical safety measures have advantages such as no need for additional installation process and space and feasible application thereof to all kinds of batteries, but suffer from problems associated with incapability to provide reliable operation and deterioration of battery performance due to addition of materials.

As such, there is an urgent need for the development of a novel chemical safety measure to prevent the risk of ignition/explosion without significant deterioration of general performance of the battery upon overcharge thereof.

SUMMARY OF THE INVENTION

Therefore, the present invention has been made to solve the above problems and other technical problems that have yet to be resolved.

As a result of a variety of extensive and intensive studies and experiments to solve the problems as described above, the inventors of the present invention have discovered, as will be described hereinafter, the facts that, when a compound or polymer having a urethane group is added to electrodes and/or electrolyte of a lithium secondary battery, the thus-added compound or polymer decomposes upon overcharge of the battery, thereby obtaining the time delay effects for securing battery safety, or the decomposition products result in a sharp increase in battery resistance, and thereby it is possible to suppress abnormal operation of the battery. Most of conventional technologies securing battery safety via electrochemical reaction of the battery additives increase internal resistance of the battery by an increased molecular weight of reactants via recombination or polymerization between the additives under certain conditions, whereas the present invention achieves desired effects via decomposition of the additives. Further, it was confirmed that additives of the present invention exhibit very little adverse effects on general performance of the battery under normal operating conditions and provide highly reliable safety. The present invention has been completed based on these findings.

BRIEF DESCRIPTION OF THE DRAWING

FIG. 1 is a graph showing changes in battery temperatures and voltages upon overcharge, for batteries of Examples 1 through 3 and Comparative Example 1 in Experimental Example 1.

DETAILED DESCRIPTION OF PREFERRED EMBODIMENTS

In accordance with an aspect of the present invention, the above and other objects can be accomplished by the provision of a lithium secondary battery comprising an electrode assembly composed of a cathode, an anode and a separator, and a lithium electrolyte, wherein the electrodes and/or electrolyte include a compound and/or polymer which are decomposed upon overcharge of the battery and contain a urethane group in a molecular structure thereof.

As used herein, the term "overcharge" refers to charge of any battery over a predetermined capacity range, i.e., the application of charge current after the battery has reached full charge, and overcharge capacity may vary depending upon kinds of batteries, design methodology thereof and the like. For example, when the overcharge is defined as 4.5 volts, the urethane compound or polyurethane may be a material that is decomposed over 4.5 volts relative to a lithium redox potential.

The compound containing a urethane group in a molecular structure thereof (hereinafter, also referred to as "urethane compound") may include ethyl carbamate without being limited thereto.

The polymer containing a urethane group in a molecular structure thereof (hereinafter, also referred to as "polyurethane") refers to a polymer containing a urethane group in a main chain or side chain thereof and may include, is not limited to, polyester urethanes, polyether urethanes and urethane-based synthetic rubbers.

The inventors of the present invention have surprisingly discovered through a variety of experiments that addition of the urethane compound or polyurethane to electrodes or electrolyte of the battery has very insignificant adverse effects on general performance of the battery, and the thus-added compound or polymer is easily decomposed under a certain overcharge condition, thereby offering the time delay effects for securing battery safety and also resulting in high-internal resistance of the battery. These results are believed due to unique characteristics of the urethane group. Particularly preferred is polyurethane.

The polyurethane that can be utilized in the present invention may be those prepared using various kinds of monomers and methods.

For example, polyurethane may be prepared by bulk or suspension polymerization of a polyol compound and an isocyanate compound. Among the molecular structure of polyurethane, the polyol compound constituting the soft segment of polyurethane may be polyethylene glycol (PEG), polypropylene glycol (PPG), polyisobutylene glycol, polytetramethylene glycol (PTMG), polycaprolactone, polyethylene adipate or glycerine. Whereas, as the isocyanate compound which is the hard segment of polyurethane, there may be used, for example, 4,4-diphenylmethane diisocyanate (MDI), 2,4-, 2,6-toluene diisocyanate (TDI), 4,4-dicyclohexylmethane diisocyanate ($H_{12}$MDI), trans-1,4-cyclohexane diisocyanate (CHDI), isophorone diisocyanate (IPDI:), tetramethyl-1,3-xylene diisocyanate (TMXDI), dimeryl diisocyanate (DDI) and hexamethylene diisocyanate (HMDI). If necessary, in order to adjust the structure and physical properties of polyurethane, catalysts such as 1,4-diazabicyclo octane and dibutyltin dilaurate, and a chain extender such as 1,4-butanediol may be additionally employed.

Although there is no particular limit to a molecular weight range of polyurethane, those having a molecular weight of several tens of thousands to several hundreds of thousands may be preferably used.

Inter alia, polyether urethane, which is also used as a polymer electrolyte, is more preferable. In the polyether urethane, polyol components, which are used in synthesis of the polyether urethane, such as PEG and PPG, contain multiple ether bonds in their molecular chains, and such ether bond sites can maintain stable physical bonding state with lithium transition metal oxides as an electrode active material. Therefore, addition of polyether urethane to electrodes also exerts high-temperature safety improving effects of the battery.

Either or both of the urethane compound and polyurethane may be added to electrodes or electrolytes, or electrodes and electrolytes. The urethane compound having a low molecular weight may be added to both electrodes and electrolytes. Whereas, the polyurethane having a high molecular weight may lead to lowering of the mobility of lithium ions when it is added to the electrolyte, and is thus preferably added to electrodes.

Of active materials having a layered crystal structure and active materials having a spinel crystal structure, which are widely used as cathode active materials of lithium secondary batteries, particularly lithium transition metal compounds having a spinel crystal structure exhibit a relatively low safety at high temperatures. Therefore, when the polyether urethane is added to a cathode made of a lithium transition metal oxide having a spinel crystal structure, it is possible to improve high temperature safety as well as overcharge safety, as discussed hereinbefore.

An amount of the urethane compound or polyurethane to be added may be determined within a range that is not detrimental to general performance of the battery. As a preferred example, the content of the urethane compound or polyurethane may be in the range of 0.1 to 20% by weight, based on the weight of the electrode or electrolyte. When the content of the additive is too low, it is difficult to achieve desired safety improving effects. On the other hand, too high contents of the additive may undesirably lead to significant deterioration of general performance of the battery. Particularly preferred is within the range of 0.5 to 15% by weight, based on the weight of the electrode or electrolyte. Proper amount of the additive may also be determined by charge rates set according to batteries, and if desired, a higher content of the additive than the above range may be added.

Hereinafter, the other remaining components necessary for the lithium secondary battery in accordance with the present invention will be described.

The lithium secondary battery is comprised of a cathode, an anode, a separator and a non-aqueous electrolyte containing a lithium salt.

The cathode is, for example, fabricated by applying a mixture of the cathode active material, a conductive material and a binder to a cathode current collector, followed by drying. If desired, other fillers may be further added to the above mixture.

The cathode current collector is generally fabricated to have a thickness of 3 to 500 μm. There is no particular limit to the cathode current collector, so long as it has high conductivity without causing chemical changes in the fabricated battery. As examples of the cathode current collector, mention may be made of stainless steel, aluminum, nickel, titanium, sintered carbon, and aluminum or stainless steel which was surface-treated with carbon, nickel, titanium or silver. The current collector may be fabricated to have fine irregularities on the surface thereof so as to enhance adhesiveness to the cathode active material. In addition, the current collector may take various forms including films, sheets, foils, nets, porous structures, foams and non-woven fabrics.

Examples of the cathode active material that can be used in the present invention may include, but are not limited to, layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+x}Mn_{2-x}O_4$ ($0 \leq x \leq 0.33$), $LiMnO_3$, $LiMn_2O_3$ and $LiMnO_2$; lithium copper oxide ($Li_2CuO_2$); vanadium oxides such as $LiV_3O_8$, $LiFe_3O_4$, $V_2O_5$ and $Cu_2V_2O_7$; Ni-site type lithium nickel oxides of Formula $LiNi_{1-x}M_xO_2$ (M=Co, Mn, Al, Cu, Fe, Mg, B or Ga, and $0.01 \leq x \leq 0.3$); lithium manganese composite oxides of Formula $LiMn_{2-x}M_xO_2$ (M=Co, Ni, Fe, Cr, Zn or Ta, and $0.01 \leq x \leq 0.1$), or Formula $Li_2Mn_3MO_8$ (M=Fe, Co, Ni, Cu or Zn); $LiMn_2O_4$ wherein a portion of Li is substituted with alkaline earth metal ions; disulfide compounds; and $Fe_2(MoO_4)_3$.

The conductive material is usually added in an amount of 1 to 50% by weight, based on the total weight of the mixture including the cathode active material. There is no particular limit to the conductive material, so long as it has suitable conductivity without causing chemical changes in the fabricated battery. As examples of conductive materials, mention may be made of conductive materials, including graphite such as natural or artificial graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive oxides such as titanium oxide; and polyphenylene derivatives. Where appropriate, addition of the conductive material may be omitted due to addition of a second conductive coating layer to the cathode active material.

The binder is a component assisting in binding between the active material and conductive material, and in binding with the current collector. The binder utilized in the present invention is typically added in an amount of 1 to 50% by weight, based on the total weight of the mixture including the cathode active material. As examples of the binder, mention may be made of polyvinylidene fluoride, polyvinyl alcohols, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber and various copolymers.

The filler is an optional ingredient used to inhibit cathode expansion. There is no particular limit to the filler, so long as it does not cause chemical changes in the fabricated battery and is a fibrous material. As examples of the filler, there may be used olefin polymers such as polyethylene and polypropylene; and fibrous materials such as glass fiber and carbon fiber.

The anode is fabricated by applying anode materials to an anode current collector, followed by drying. If necessary, other components, as described above, may be further added.

The anode current collector is generally fabricated to have a thickness of 3 to 500 μm. There is no particular limit to the anode current collector, so long as it has suitable conductivity without causing chemical changes in the fabricated battery. As examples of the anode current collector, mention may be made of copper, stainless steel, aluminum, nickel, titanium, sintered carbon, copper or stainless steel having a surface treated with carbon, nickel, titanium or silver, and aluminum-cadmium alloys. Similar to the cathode current collector, the anode current collector may also be fabricated to form fine irregularities on the surface thereof so as to enhance adhesiveness to the anode active material. In addition, the anode current collector may take various forms including films, sheets, foils, nets, porous structures, foams and non-woven fabrics.

As examples of the anode materials utilizable in the present invention, mention may be made of carbon such as non-graphitizing carbon and graphite based carbon; metal composite oxides such as $Li_xFe_2O_3$ ($0 \leq x \leq 1$), $Li_xWO_2$ ($0 \leq x \leq 1$) and $Sn_xMe_{1-x}Me'_yO_z$ (Me: Mn, Fe, Pb, Ge; Me': Al, B, P, Si, group I, II and III elements of the Periodic Table, halogen atoms; $0 < x \leq 1$; $1 \leq y \leq 3$; and $1 \leq z \leq 8$); lithium metals; lithium alloys; silicon based alloys; tin alloys; oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni based materials.

The separator is interposed between the cathode and anode. As the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and electrolyte.

The non-aqueous electrolyte containing a lithium salt is composed of a non-aqueous electrolyte and lithium. As the non-aqueous electrolyte, a liquid organic solvent, solid electrolyte and inorganic solid electrolyte may be utilized.

As the organic solvent that can be used in the present invention, for example, mention may be made of non-protic organic solvents such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

As examples of the organic solid electrolyte utilized in the present invention, mention may be made of polyethylene derivatives, polyethylene oxide derivatives, polypropylene oxide derivatives, phosphoric acid ester polymer, poly agitation lysine, polyester sulfide, polyvinyl alcohol, poly(vinylidene fluoride), and polymers containing ionic dissociation groups.

As examples of the inorganic solid electrolyte utilized in the present invention, mention may be made of nitrides, halides and sulphates of lithium such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH and $Li_3PO_4$—$Li_2S$—$SiS_2$.

The lithium salt is a material that is readily soluble in the above-mentioned non-aqueous electrolyte and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imide.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas.

The lithium secondary battery of the present invention may be prepared by conventional methods known in the art. That is, the lithium secondary battery can be prepared by disposing a porous separator between the cathode and anode, followed by introduction of an electrolyte thereto.

The cathode can be, for example, fabricated by applying a slurry containing the lithium transition metal oxide active material as described above, a conductive material and a binder to a current collector, followed by drying. Similar to the cathode, the anode can also be fabricated by applying a slurry containing a carbon active material as described above, a conductive material and a binder to a thin current collector, followed by drying.

There is no limit to a structure of the cathode, anode and separator in the lithium secondary battery in accordance with the present invention, and for example, mention may be made of a stacking type or winding type in which each sheet is inserted in a cylinder-, square- or pouch-shaped case.

EXAMPLES

Now, the present invention will be described in more detail with reference to the following examples. These examples are provided only for illustrating the present invention and should not be construed as limiting the scope and spirit of the present invention.

Example 1

An anode was fabricated by mixing 93% carbon active material (MCMB10-28, Osaka Gas Co.) and 7% polyvinylidene difluoride (PVDF) (Kynar 761, Elf Atochem) in N-methyl-2-pyrrolidone (NMP) as a solvent for 2 hours, using a mixer (IKA Mixer) and coating the resulting mixture on a copper foil current collector, followed by drying at 130° C.

A cathode was fabricated by adding 1% by weight of polyurethane having a molecular weight of 42,000 to 45,000, which was prepared by suspension polymerization of polyethylene glycol (PEG) as a polyol compound and toluene diisocyanate (TDI) as an isocyanate compound, to a mixture of 91% $LiNi_{1/3}Co_{1/3}Mn_{1/3}O_2$, 3% PVDF (Kynar 761) and 6% conductive carbon (KS-6, Lonza), mixing the components in N-methyl-2-pyrrolidone (NMP) as a solvent for 2 hours, using a mixer (IKA Mixer) and coating the resulting mixture on an aluminum foil current collector, followed by drying at 130° C.

Then, a separator (celgard 2400, Hoechst Celanese) was interposed between the anode and cathode thus prepared as above, and a polymer cell was assembled, followed by injection of the electrolyte thereto to prepare a lithium-ion secondary battery.

Example 2

A battery was prepared in the same manner as in Example 1, except that 3% by weight of polyurethane was added to a cathode.

Example 3

A battery was prepared in the same manner as in Example 1, except that 10% by weight of polyurethane was added to a cathode.

Comparative Example 1

A battery was prepared in the same manner as in Example 1, except that polyurethane was not added.

Experimental Example 1

Batteries of Examples 1 through 3 and Comparative Example 1 were continuously charged at 1.2 A, 1 C rate for more than 480 min, during which the battery temperatures and voltages were measured. Experimental results are shown in FIG. 1.

As can be seen from FIG. 1, the battery of Comparative Example 1 (ref), to which polyurethane was not added, exhibited sharp drop of the voltage with a sudden rise of the battery temperature at a time point of about 160 min. That is, the battery exploded at that charge time. Whereas, the battery of Example 1 (pu1), to which 1% by weight of polyurethane was added, exhibited sharp rise of the voltage at a time point of about 270 min, thus representing that polyurethane provides time delay effects upon overcharge of the battery. Such time delay effects were more significant in the battery of Example 2 (pu3) in which the amount of polyurethane was increased. Particularly, the battery of Example 3 (pu10), to which 10% by weight of polyurethane was added, exhibited battery safety in the range of charge time under given experimental conditions.

Example 4

A battery was prepared in the same manner as in Example 1, except that 2% by weight of polyurethane, which was prepared by suspension polymerization of polypropylene glycol (PPG) and diphenylmethane diisocyanate (MDI), was added to a cathode.

Example 5

A battery was prepared in the same manner as in Example 4, except that 10% by weight of polyurethane was added to a cathode.

Example 6

A battery was prepared in the same manner as in Example 4, except that 5% by weight of polyurethane was added to an anode.

Example 7

A battery was prepared in the same manner as in Example 4, except that 3% by weight of ethyl carbamate was added to an electrolyte.

Experimental Example 2

For batteries of Examples 4 through 6, the same experiments were repeated as in Experimental Example 1.

As a result, it was confirmed that these batteries exhibited sharp rise in the battery voltage after at least about 250 min had passed. Therefore, when various kinds of polyurethane or urethane compounds are added to the electrodes or electrolyte, it is possible to achieve time delay effects for securing safety upon overcharge, thereby being capable of improving overcharge safety.

INDUSTRIAL APPLICABILITY

As apparent from the above description, a lithium secondary battery in accordance with the present invention is characterized by addition of a compound or polymer having a urethane group to electrodes and/or electrolyte, wherein the thus-added compound and/or polymer have substantially no adverse effects on general performance of the battery under normal operating conditions and are decomposed with high reliability upon overcharge of the battery, thereby offering time delay effects for securing battery safety, and the decomposition products thereof result in increased internal resistance of the battery, thereby increasing battery safety.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A lithium secondary battery comprising
an electrode assembly composed of:
a cathode comprising a cathode active material, a conductive material, and a binder,
an anode comprising an anode active material, a conductive material, and a binder,
a separator, and
a lithium electrolyte,
wherein at least one of the cathode and the anode further comprises an additive comprising a polyether urethane compound prepared by suspension polymerization of a polyol compound and a diisocyanate compound which is decomposed over 4.5 volts of the battery and contains a urethane group in a molecular structure thereof, and which is present in an amount of 1 to 10 percent by weight, based on the weight of the cathode or the anode, respectively;
wherein the urethane group has a moiety prepared from polyethylene glycol or polypropylene glycol and a moiety prepared from toluene diisocyanate or diphenylmethane diisocyanate; and
wherein the binder is selected from the group consisting of polyvinylidene fluoride, polyvinyl alcohols, carboxymethylcellulose, starch, hydroxypropylcellulose, regenerated cellulose, polyvinyl pyrollidone, tetrafluoroethylene, polyethylene, polypropylene, ethylene-propylene-diene terpolymer, sulfonated ethylene-propylene-diene terpolymer, styrene butadiene rubber, and fluoro rubber.

2. The lithium secondary battery according to claim 1, wherein the polyol compound is polyethylene glycol.

3. The lithium secondary battery according to claim 1, wherein the polyol compound is polypropylene glycol.

4. The lithium secondary battery according to claim 1, wherein the diisocyanate compound is toluene diisocyanate.

5. The lithium secondary battery according to claim 1, wherein the diisocyanate compound is diphenylmethane diisocyanate.

* * * * *